Feb. 23, 1937.　　　H. E. PROCTER　　　2,071,358
GAUGE AND LOCATING DEVICE FOR TORPEDO TUBES
Filed Jan. 8, 1936
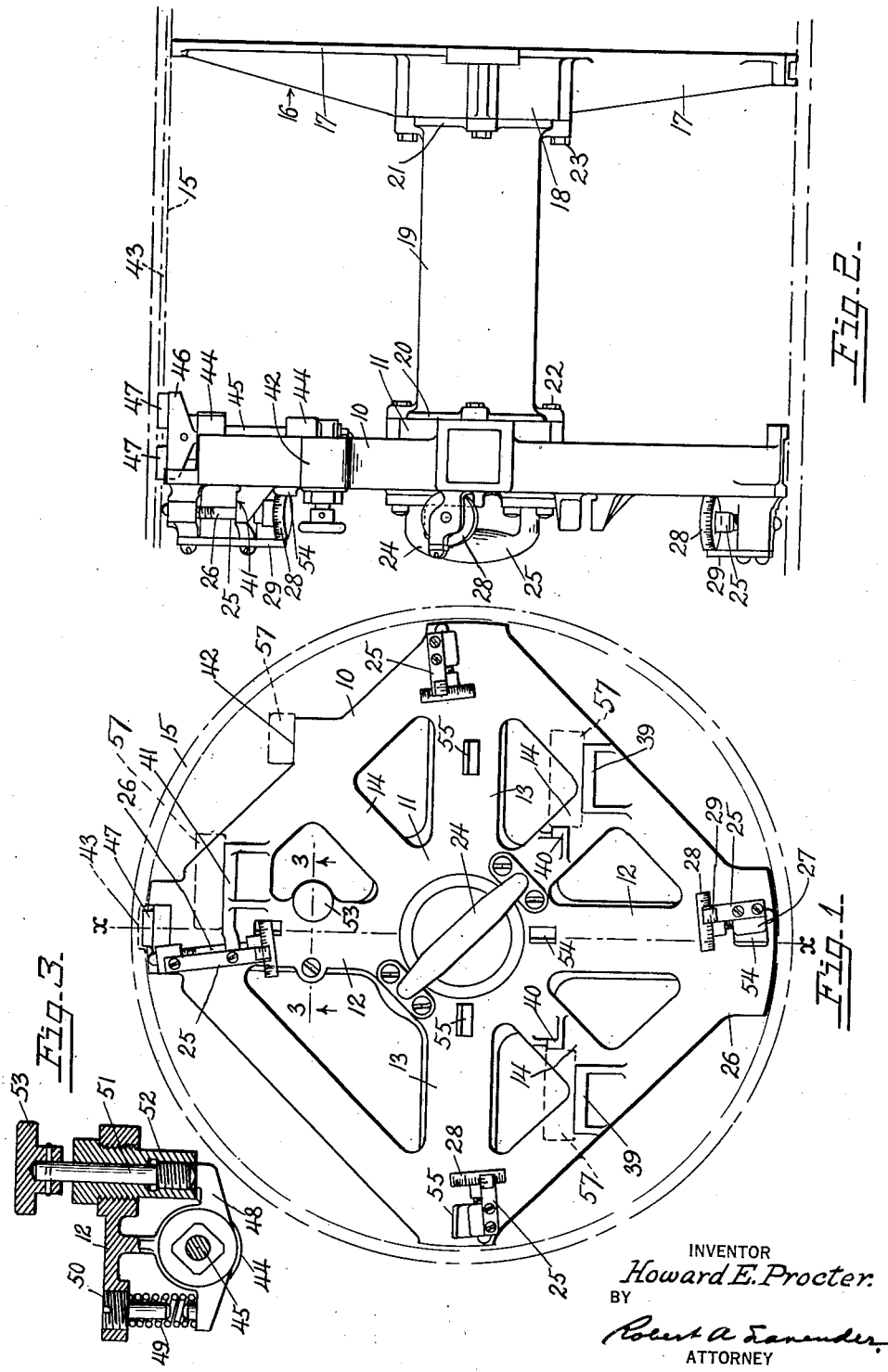
INVENTOR
Howard E. Procter.
BY
Robert A. Lavender
ATTORNEY Patented Feb. 23, 1937

2,071,358

UNITED STATES PATENT OFFICE 2,071,358

GAUGE AND LOCATING DEVICE FOR TORPEDO TUBES

Howard E. Procter, Portsmouth, N. H.

Application January 8, 1936, Serial No. 58,051

8 Claims. (Cl. 33—174)

(Granted under the act of March 3, 1883, as amended April 30, 1928; 370 O. G. 757)

The present invention relates to gauges and it has for its principal object the provision of a new and improved device for setting and checking the positions and adjustments of the various setting spindles, bolts and latches of torpedo tubes which cooperate with and render active similar corresponding instrumentalities of a torpedo prior to its ejection from the tube.

With these and other objects in view, as well as other advantages that may be incident to the use of the improvements, the invention consists in the parts and combinations thereof hereinafter set forth and claimed, with the understanding that the several necessary elements constituting the same may be varied in proportion and arrangement without departing from the nature and scope of the invention, as defined in the appended claims.

In order to make the invention more clearly understood, there are shown in the accompanying drawing, means for carrying the invention into practical effect, without limiting the improvements in their useful application to the particular construction, which, for the purpose of explanation, have been made the subject of illustration.

In the accompanying drawing:

Fig. 1 is a front elevational view of a gauge and locating instrument embodying the invention;
Fig. 2 is a side elevational view of the structure shown in Fig. 1; and Fig. 3 is an enlarged fragmentary sectional view taken on line 3—3 of Fig. 1.

Referring to the drawing, a gauge constructed in accordance with the invention is shown as comprising a substantially square frame 10 connected with a central hub portion 11 by vertical legs 12, horizontal legs 13 and diagonally disposed legs 14, all of said parts being preferably constructed of aluminum and cast integrally with one another. This frame is maintained in a position substantially normal to the axis of a torpedo tube, indicated by broken lines 15, by means of a spider 16 of cruciform cast aluminum construction the legs 17 of which radiate from a central hub portion 18. The frame 10 and spider 16 are held in axially spaced relation by a tubular barrel 19 having flanges 20 and 21 at opposite ends which are bolted to the hub portions 11 and 18 by bolts 22 and 23 respectively. The frame 10 is provided with a handle 24 by means of which the gauge may be transported and positioned within a torpedo tube.

Located at each of the corners of the frame 10 is a micrometer gauge 25 for engagement with the inner circumferential surface of the tube 15. These gauges are of ordinary construction, each comprising a stem 26 screw threaded into a lug 27 formed on the frame 10 and having a graduated manually operable dial 28 fixed thereto for cooperation with a scale 29 secured to the lug 27. The frame 10 is also formed with a pair of laterally spaced seats or shelves 39 and cooperating surfaces 40 and adapted to support gauge blocks 56 for checking the position of a setting spindle of the torpedo tube. A seat 41 is also provided on the upper portion of the frame 10 adjacent to its central vertical axis for supporting different gauge blocks 57 for a second setting spindle, and a seat or shelf 42 is formed on the upper right hand side of the frame 10 for supporting a gauge block 58 employed for checking the position of a third setting spindle. The various instrumentalities above referred to form a part of the torpedo tube construction and are operable from the outside of the tube prior to or simultaneously with the discharge of a torpedo in order to set in operation certain corresponding control instrumentalities of the torpedo mechanism.

A torpedo tube is provided with an internal guide slot, indicated at 43, which extends longitudinally along the upper surface of the tube for receiving the guide lug of the torpedo. A plane passing through the center line of this guide slot and the axis of the tube constitutes the reference plane from which all measurements are taken in locating the several operating devices hereinabove referred to. During the assembly of the operating devices on the tube this plane may or may not occupy a true vertical position on its supports, and hence it is termed the "nominal" vertical plane. In order, therefore, that the gauge may be adjusted properly so as to locate the several gauge blocks accurately with respect to this "nominal" vertical plane, the following means is provided:

Mounted in bearings 44 carried by the upper vertical leg 12 of the frame 10 is a rock shaft 45 the axis of which lies in the "nominal" vertical plane of the gauge frame 10 and carries at its upper end a longitudinally extending arm 46. This arm is formed with studs 47 at equal distances from the axis of the shaft 45 which project upwardly into the guide slot 43. These studs are of equal diameter but are slightly less than the width of the guide slot so as to allow a certain degree of clearance therebetween.

Fixed to the lower end of the shaft 45 is a transversely extending lever 48, one arm of which is biased outwardly by means of a coil spring 49 interposed between this arm and a stud 50 threaded into the leg 12. The other arm of this lever bears against the end of a jack screw 51 which is threaded into a plug 52 which is in turn screw threaded into the leg 12. This screw is provided at its opposite end with a knurled knob or handle 53 by means of which the screw may be rotated in order to turn the shaft 45 and shift the studs 47 laterally within the slot 43 for a purpose presently to be described.

In operation, the gauge is inserted within a torpedo tube the desired distance with the studs 47 extending into the guide slot 43. The laterally spaced micrometer gauges 25 are then adjusted until their stems 26 contact with the side walls of the tube at diametrically disposed points and their calibrations display equal readings. The vertically spaced micrometer gauges 25 are then similarly adjusted and when they show identical readings the center of the frame 10 will be disposed in the longitudinal axis of the torpedo tube. The jack screw 51 is then rotated by means of the knob 53 so as to swing the studs 47 about the axis of the shaft 45 until one of these studs engages one of the side walls of the slot 43. This stud will then function as a fulcrum and swing the shaft 45, the frame 10 and the parts carried thereby about the longitudinal axis of the tube until the other stud 47 engages the opposite side wall of the slot. When this occurs, the axis of the shaft 45 and the "nominal" vertical axis of the frame 10 will both lie in the "nominal" vertical plane intersecting the center line of the slot 43 and the longitudinal axis of the tube 15, thus insuring that the seats for the several gauge blocks are accurately located with respect to the various operating spindles of the torpedo tube. These instrumentalities are then operated by an operator located exterior of the tube and their positions with relation to the gauge block seats are determined by means of the gauge blocks applied by an observer within the tube.

The frame 10 is also formed with a set of three vertically arranged lugs or seats 54 and with a set of three horizontally spaced lugs 55 all provided with machined faces and constituting seats or rests for suitable scales or straight edges employed in taking measurements other than those mentioned above. For this purpose the micrometer gauges 25 are preferably offset circumferentially a slight distance to provide clearance for such instruments. It will be understood that the over all dimensions of the frame 10 and spider 16 are slightly less than the internal diameter of the tube 15, in order to facilitate the insertion of the gauge in the tube.

A gauge constructed in accordance with the invention, as hereinabove described, is not only simple and efficient in operation but materially reduces the time required to make the necessary measurements and observations and tends toward a uniformity in tube construction.

Other modifications and changes in the proportion and arrangement of the parts may be made by those skilled in the art without departing from the nature and scope of the invention as defined in the appended claims.

The invention described herein may be manufactured and used by or for the Government of the United States of America for governmental purposes without the payment of any royalties thereon or therefor.

I claim:

1. A gauge for locating the operating instrumentalities of a torpedo tube and for measuring the range of movement thereof with respect to the cooperating control devices of a torpedo to be discharged from said tube, comprising a frame adapted to be inserted in said torpedo tube; means carried by said frame for adjusting said frame bodily in a direction transverse to the longitudinal axis of said tube to a position in which the center of said frame coincides with said axis; means carried by said frame at positions corresponding to those of the control devices of a torpedo for determining the location and range of movement of the operating instrumentalities of said tube; and means carried by said frame for adjusting said frame about the longitudinal axis of said tube to a position in which a predetermined transverse reference axis thereof coincides with a corresponding reference axis of said tube.

2. A gauge for locating the operating instrumentalities of a torpedo tube and for measuring the range of movement thereof with respect to the cooperating control devices of a torpedo to be discharged from said tube, comprising a frame adapted to be inserted in said torpedo tube; laterally and vertically spaced micrometer gauges carried by said frame for adjusting said frame bodily in a direction transverse to the longitudinal axis of said tube to a position in which the center of said frame coincides with said axis; means carried by said frame at positions corresponding to those of the control devices of a torpedo for determining the location and range of movement of the operating instrumentalities of said tube; and means carried by said frame for adjusting said frame about the longitudinal axis of said tube to a position in which a predetermined transverse reference axis thereof coincides with a corresponding reference axis of said tube.

3. A gauge for locating the operating instrumentalities of a torpedo tube and for measuring the range of movement thereof with respect to the cooperating control devices of a torpedo to be discharged from said tube, comprising a frame adapted to be inserted in said torpedo tube; means carried by said frame for adjusting said frame bodily in a direction transverse to the longitudinal axis of said tube to a position in which the center of said frame coincides with said axis; seats provided on said frame at positions corresponding to those of the control devices of a torpedo for supporting different gauge blocks employed in determining the location and range of movement of the operating instrumentalities of said tube; and means carried by said frame for adjusting said frame about the longitudinal axis of said tube to a position in which a predetermined transverse reference axis thereof coincides with a corresponding reference axis of said tube.

4. A gauge for locating the operating instrumentalities of a torpedo tube and for measuring the range of movement thereof with respect to the cooperating control devices of a torpedo to be discharged from said tube, comprising a frame adapted to be inserted in said torpedo tube; means connected with said frame and spaced axially therefrom for maintaining said frame in a position substantially normal to the longitudinal axis of said tube; means carried by said frame for adjusting said frame bodily in a direction transverse to the longitudinal axis of said tube to a position in which the center of said frame coincides with said axis; means carried by said frame at positions corresponding to those of the control devices of a torpedo for determining the location and range of movement of the operating instrumentalities of said tube; and means carried by said frame for adjusting said frame about the longitudinal axis of said tube to a position in which a predetermined transverse reference axis thereof coincides with a corresponding reference axis of said tube.

5. A gauge for locating the operating instrumentalities of a torpedo tube with respect to the guide slot thereof and for measuring the range of movement of said instrumentalities with respect to the cooperating control devices of a torpedo to be discharged from said tube, comprising a frame adapted to be inserted in said torpedo tube; means carried by said frame for adjusting said frame bodily in a direction transverse to the longitudinal axis of said tube to a position in which the center of said frame coincides with said axis; means carried by said frame at positions corresponding to those of the control devices of a torpedo for determining the location and range of movement of the operating instrumentalities of said tube; and means carried by said frame and engageable with the guide slot of said tube for adjusting said frame about the longitudinal axis of said tube to a position in which a predetermined transverse reference axis thereof coincides with a corresponding reference axis of said tube.

6. A gauge for locating the operating instrumentalities of a torpedo tube with respect to the guide slot thereof and for measuring the range of movement of said instrumentalities with respect to the cooperating control devices of a torpedo to be discharged from said tube, comprising a frame adapted to be inserted in said torpedo tube; means carried by said frame for adjusting said frame bodily in a direction transverse to the longitudinal axis of said tube to a position in which the center of said frame coincides with said axis; means carried by said frame at positions corresponding to those of the control devices of a torpedo for determining the location and range of movement of the operating instrumentalities of said tube; and lever mechanism carried by said frame and engageable with the guide slot of said tube for adjusting said frame about the longitudinal axis of said tube to a position in which a predetermined transverse reference axis thereof coincides with a corresponding reference axis of said tube.

7. A gauge for locating the operating instrumentalities of a torpedo tube with respect to the guide slot thereof and for measuring the range of movement of said instrumentalities with respect to the cooperating control devices of a torpedo to be discharged from said tube, comprising a frame adapted to be inserted in said torpedo tube; means carried by said frame for adjusting said frame bodily in a direction transverse to the longitudinal axis of said tube to a position in which the center of said frame coincides with said axis; means carried by said frame at positions corresponding to those of the control devices of a torpedo for determining the location and range of movement of the operating instrumentalities of said tube; a shaft carried by said frame with its axis of rotation disposed within a longitudinal plane intersecting the center of said frame; spaced studs carried by said shaft and at equal distances from the axis thereof for engagement with the guide slot of said tube; and means for rotating said shaft and the studs carried thereby to shift said frame about the longitudinal axis of said tube to adjust said frame angularly to a position in which the plane intersecting the axis of said shaft and the center of said frame coincides with the plane intersecting the center line of said guide slot and the longitudinal axis of said tube.

8. A gauge for locating the operating instrumentalities of a torpedo tube with respect to the guide slot thereof and for measuring the range of movement of said instrumentalities with respect to the cooperating control devices of a torpedo to be discharged from said tube, comprising a frame adapted to be inserted in said torpedo tube; means carried by said frame for adjusting said frame bodily in a direction transverse to the longitudinal axis of said tube to a position in which the center of said frame coincides with said axis; means carried by said frame at positions corresponding to those of the control devices of a torpedo for determining the location and range of movement of the operating instrumentalities of said tube; a shaft carried by said frame with its axis of rotation disposed within a longitudinal plane intersecting the center of said frame; spaced studs fixed to one end of said shaft and at equal distances from the axis thereof for engagement with the guide slot of said tube; a lever fixed to the other end of said shaft; and a jack screw for swinging said lever to rotate said shaft and the studs carried thereby to shift said frame angularly about the longitudinal axis of said tube to adjust said frame to a position in which the plane intersecting the axis of said shaft and the center of said frame coincides with the plane intersecting the center line of said guide slot and the longitudinal axis of said tube.

HOWARD E. PROCTER.